United States Patent [19]
Saito

[11] Patent Number: 5,974,732
[45] Date of Patent: Nov. 2, 1999

[54] METHOD FOR PRODUCING AND PACKING SIMPLE SEEDBED WITH SEEDS

[75] Inventor: Shuuiti Saito, Gunma, Japan

[73] Assignee: Sytec Co., Ltd., Ota, Japan

[21] Appl. No.: 08/986,591

[22] Filed: Dec. 8, 1997

[51] Int. Cl.$^6$ ........................................ A01C 1/04
[52] U.S. Cl. .................................................. 47/56
[58] Field of Search ........................... 47/15, 56, DIG. 9

[56] References Cited

U.S. PATENT DOCUMENTS

| | | | |
|---|---|---|---|
| 851,171 | 4/1907 | Israel | 47/56 |
| 1,501,969 | 7/1924 | Pauls | 47/15 |
| 3,172,234 | 3/1965 | Eavis | 47/56 |
| 4,972,627 | 11/1990 | Hori et al. | 47/15 |
| 5,226,255 | 7/1993 | Robertson | 47/56 |
| 5,235,781 | 8/1993 | Holley | 47/56 |
| 5,245,785 | 9/1993 | Taniguchi et al. | 47/56 |
| 5,417,010 | 5/1995 | Ecer | 47/56 |
| 5,421,123 | 6/1995 | Sakate et al. | 47/56 |

*Primary Examiner*—Robert P. Swiatek
*Assistant Examiner*—Elizabeth Shaw
*Attorney, Agent, or Firm*—Young & Thompson

[57] ABSTRACT

Using a seedbed with seeds, labor-saving farming can be realized, and a small amount of seedbeds can be provided as necessary in home gardening or small-scale farming. In large-scale farming, the seedbed with seeds reduces the labor required to replant young plants from the seedbeds into the ground using the existing tools and materials in production and marketing. Furthermore, simple and labor-saving seedbeds can be provided regardless of the amount of plants to be grown. The seedbed with seeds includes plant seeds, cotton-wool-like organic fiber bundle which is fluffy like cotton wool because of the twist and wave of the fiber although pieces of the fiber are arranged almost in the same direction; and a water-soluble paper. The plant seeds are inserted into the cotton-wool-like bundle. The cotton-wool-like bundle containing the plant seeds is compressed, as long as air and water are appropriately supplied, in the direction vertical to the direction of the fiber. The water-soluble paper is rolled in a way that the cotton-wool-like organic fiber bundle is covered. Both ends of the water-soluble paper roll are fixed with a fixing agent.

18 Claims, 2 Drawing Sheets

METHOD FOR PRODUCING AND PACKING SIMPLE SEEDBED WITH SEEDS

BACKGROUND OF THE INVENTION

1. Field of the Invention

The present invention relates to a seedbed of plant seeds, and more specifically to a simple seedbed with seeds which gives good conditions for seeds to sprout only by putting the seedbed in water.

2. Description of the Related Art

A conventional seedbed is designed to plant seeds in a way that the seeds can be kept Just covered with water or a mixture of water and liquid fertilizer in a tray, etc., to plant seeds in the earth soaking up water, and to plant seeds in, or in the hole made in, material like sponge which soaks up water in place of the ground.

Normally, in home gardening or small-scale farming, plant seeds are put directly in the ground to sprout with fertilizer appropriately provided, or young plants which have already sprouted from seeds are purchased or obtained in other methods to grow the plants in the ground, not in a seedbed.

Also in large-scale farming, desired plant seeds and basic materials such as seedbed containers, water and liquid fertilizer, earth, etc. should be prepared by a grower to obtain the necessary amount of young plants, put the water and earth in the containers, and plant the prepared seeds in the prepared basic materials.

However, in the conventional seed planting directly in the ground, planted seeds are often eaten by birds and small animals, or may not sprout due to inappropriate amount of water or earth covering the seeds. As a result, it is not certain how may seeds can successfully sprout, and it is difficult to correctly estimate how the seeds can grow in the given ground. Additionally, if some seeds do not sprout, young sprouting plants are positioned at irregular intervals, thereby reducing the productivity.

In large-scale farming, it is a time- and labor-consuming work to prepare seedbeds, plant seeds, and replant young sprouting plants from the seedbeds into the ground.

SUMMARY OF THE INVENTION

The present invention aims at providing time- and labor-saving seedbeds for home gardening and small-scale farming, that is, at providing even a small number of seedbeds depending on necessity. In large-scale farming, the present invention reduces the labor required to replant young plants from the seedbeds into the ground using the existing tools and materials in production and marketing.

The present invention includes plant seeds, cotton-wool-like organic fiber bundle which is fluffy like cotton wool because of the twist and wave of the fiber although pieces of the fiber are arranged almost in the same direction; and a water-soluble paper. The plant seeds are inserted into the cotton-wool-like bundle. The cotton-wool-like bundle containing the plant seeds is compressed, as long as air and water are appropriately supplied, in the direction vertical to the direction of the fiber. The water-soluble paper is rolled in a way that the cotton-wool-like organic fiber bundle is covered. Both ends of the water-soluble paper roll are fixed with a fixing agent.

That is, regardless of the amount of required plants to be grown, the present invention provides a simple and labor-saving seedbed.

DESCRIPTION OF THE PREFERRED EMBODIMENT

Figure 1A:
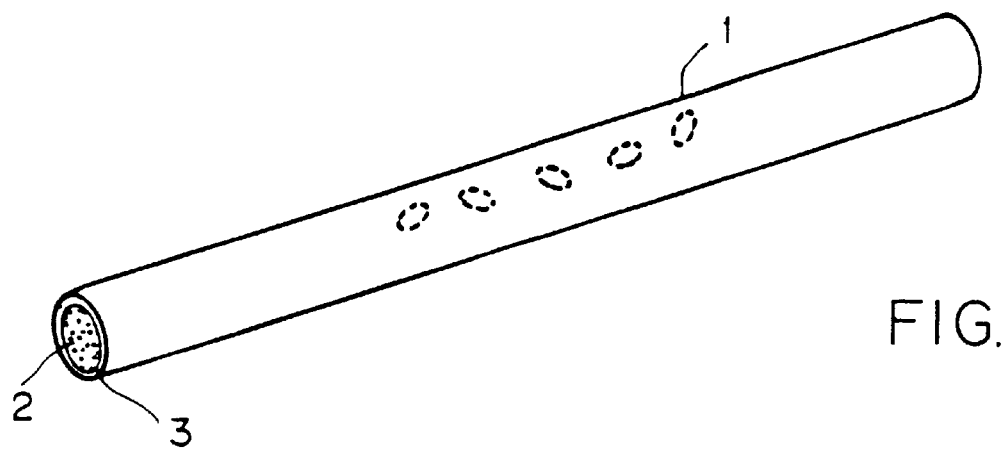
FIG. 1 shows an example of an embodiment of the seedbed with seeds according to the present invention.

The embodiment of the present invention is described below by referring to the attached drawings.

FIG. 1 shows the entire configuration of the seedbed with seeds according to the present invention.

Seeds 1 are common plant seeds, for example, seeds of rice, seeds of foliage plants, seeds for home gardening, etc.

Pieces of a fiber of a cotton-wool-like fiber bundle 2 are arranged in almost the same direction, but the cotton-wool-like organic fiber bundle is fluffy like cotton wool because of the twist and wave of the fiber itself. The cotton-wool-like fiber bundle 2 is the same in material as the fiber bundle used as a filter portion of cigarette, but can be designed for a length of a piece of cigarette or an optional length as necessary.

A water-soluble paper 3 is commonly marketed water-soluble paper. It is, for example, a natural organic fiber such as pulp, etc. formed as a sheet using its adhesive characteristic when the fiber turns its state from a water-solved state to a dry state, or formed as a sheet using a water-soluble binding material, etc. The adhesive material for fixing both ends of the water-soluble paper 3 is also commonly marketed water-soluble adhesive material, for example, a starch paste.

A sprout 4 is a substance generated from the seeds 1 depending on the conditions of necessary water, temperature, etc.

A root 5 is a portion generated from the seeds 1 depending on the conditions of necessary water, temperature, etc. as with the sprout 4 described above.

The simple seedbed with the seeds 1 in the state shown in FIG. 1A is put in a tray with water just covering the seeds, on the sufficiently wet earth, or on the earth with water supplied sufficiently.

The water-soluble paper 3 shown in FIG. 1A begins to be solved in water, and the weakest point in the water-soluble paper 3 has a crack and is broken by the swelling force of the compressed cotton-wool-like fiber bundle 2. Then, the cotton-wool-like fiber bundle 2 swells and turns its state as shown in FIG. 1B.

Figure 1B:
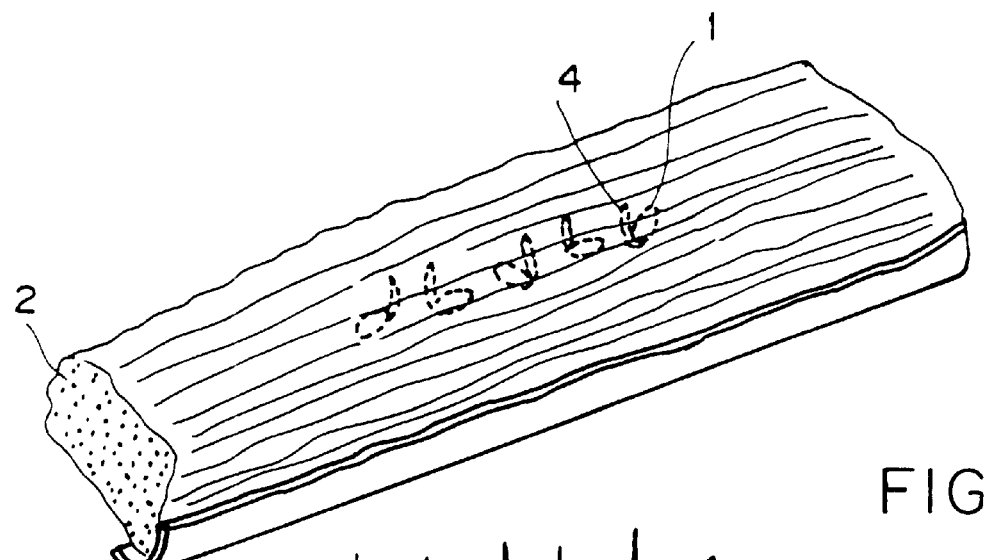

In FIG. 1B, the water-soluble paper 3 has not been completely solved, but exists around the cotton-wool-like fiber bundle 2. However, the cotton-wool-like fiber bundle 2 has sufficiently swelled with surrounding water absorbed inside. Since enough water has been supplied for the seeds 1, the cotton-wool-like fiber bundle 2 has swelled, and air is appropriately supplied, the seeds 1 contained in the cotton-wool-like fiber bundle 2 is encouraged to generate the sprout 4.

Figure 1C:
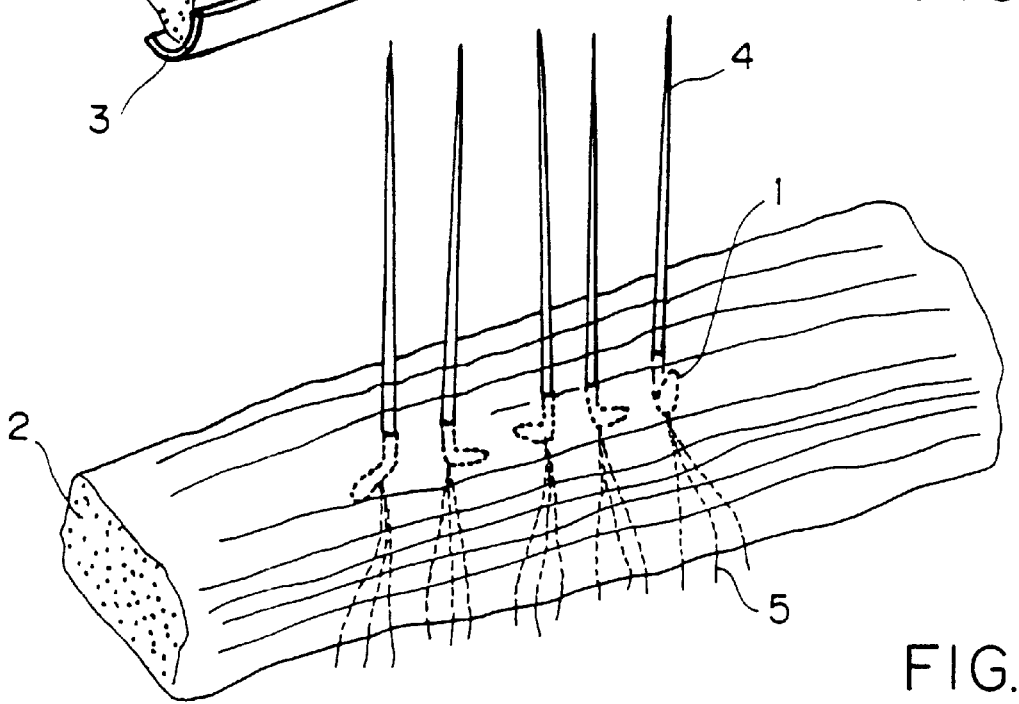

The solution of the water-soluble paper 3 as shown in FIG. 1C proceeds with time, and the water-soluble paper 3 is completely solved, enters a pulp state, and becomes decomposed organic matter. However, since water and air are continuously supplied, the sprout 4 continues its growth into young plants.

When the seedbed with seeds is used in large-scale farming, not in the above described home gardening or farming foliage plants, the seedbed with seeds is prepared by changing the thickness of the seedbed with seeds to adjust the amount of the cotton-wool-like fiber bundle 2 depending on the size of the seeds of a plant to be grown, and by making a long seedbed with seeds without cutting it into the length of cigarette. Furthermore, the amount of plant seeds inserted into the cotton-wool-like fiber bundle 2 and the interval of the insertion are adjusted when the seedbed with seeds is produced. Thus, the efficiency of farming operations can be greatly improved.

Figure 2:
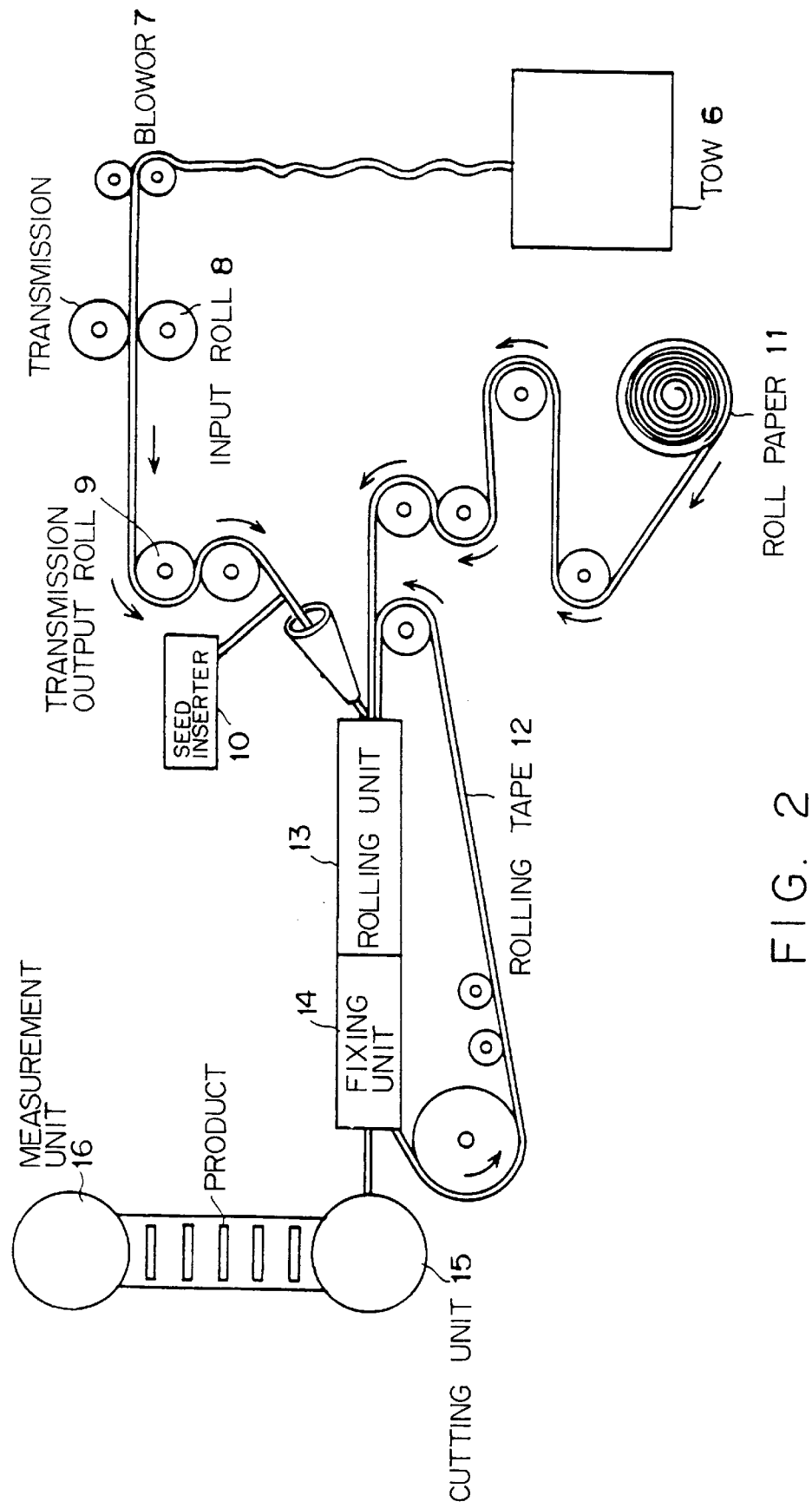
FIG. 2 shows an example of a method of producing an embodiment of the seedbed with seeds according to the present invention.

FIG. 2 shows the process of producing the simple seedbed with seeds according to the present invention.

A tow 6 of sliver of a cotton-wool-like fiber bundle swells after being blown by an air blower 7, and passes through an input roll 8 and an output roll 9. A seed inserter 10 inserts seeds at predetermined positions at predetermined intervals. Then, the bundle enters a rolling unit 13 at which the bundle proceeds with a rolling tape 12, and is compressed and rolled by a roll paper 11. Finally, the rolled bundle is formed as a pole, transmitted to a fixing unit 14, fixed, and dried.

A cutting unit 15 cuts the roll paper containing the rolled and fixed cotton-wool-like fiber bundle into finished products of a predetermined length in synchronization with the speed of the rolling tape 12. The finished products are measured by a measurement unit 16 and checked for quality. When the finished products pass the quality check, they are packed (not shown in FIG. 2) and delivered to clients.

In this production process, the plant seeds can be inserted by the seed inserter 10 at predetermined positions and at predetermined intervals before the cotton-wool-like fiber bundle is rolled by the roll paper with the length of the bundle set as the full length of cigarette.

When the obtained seedbed with seeds is packed as a product for sale, it takes the form of cigarette having the length of cigarette. Therefore, the conventional cigarette packing device can be used as is.

Furthermore, since the seedbeds with seeds can be packed similarly as cigarette, then can be sold through existing vending machines.

Although the seedbed with seeds having the length of cigarette is produced according to the present embodiment, the present invention is not limited to this application. For example, a seedbed with seeds having a smaller or larger diameter, or having a length of as long as 1 m can also be produced.

As described above, the present invention has the following effect.

According to an aspect of the present invention, labor-saving farming can be realized, and a small amount of seedbeds can be provided as necessary in home gardening or small-scale farming. In large-scale farming, the present invention reduces the labor required to replant young plants from the seedbeds into the ground using the existing tools and materials in production and marketing. Furthermore, simple and labor-saving seedbeds can be provided regardless of the amount of plants to be grown.

Additionally, since all materials of the seedbed with seeds according to the present invention can be decomposed into the ground, no toxic substance or material is left in the ground, the seedbed with seeds according to the present invention can be marketed as a product recommendable in ecology.

According to another aspect of the present invention, a fertilizer required to encourage plants to grow can be packed together with seeds.

According to a further aspect of the present invention, a labor-saving seedbed can be realized regardless of the amount of plants to be grown.

According to a further aspect of the present invention, a further labor-saving seedbed can be realized by packing together with seeds a fertilizer required to encourage the seeds and plants to grow.

According to a further aspect of the present invention, existing materials for cigarette, packing material, and packing devices can be used as is.

What is claimed is:

1. A seedbed with seeds comprising:

plant seeds;

a cotton-wool-like organic fiber bundle having fibers arranged in a uniform direction; and a water-soluble paper, wherein said plant seeds are inserted into said bundle so as to be buried within said fiber bundle and the entire outer surface of said slant seeds are in direct contact with said fiber bundle;

said cotton-wool-like bundle containing said plant seeds is compressed in a direction vertical to the uniform direction of the fiber; and said water-soluble paper is rolled to cover an exterior longitudinal surface of said organic fiber bundle, and both longitudinal ends of a formed water-soluble paper roll are fixed with a fixing agent applied to said ends.

2. The seedbed with seeds according to claim 1, wherein a water-soluble fertilizer effective in growing plants generated from said plant seeds is inserted at a position not directly touching said seeds.

3. The seedbed with seeds according to claim 1, wherein said water-soluble paper begins to be solved by soaking up water after being placed in soil and absorbing water, has a crack in a weak position, and exposes said cotton-wool-like fiber bundle inside said water-soluble paper; and said cotton-wool-like fiber bundle is adapted to be released by the crack in said water-soluble paper from a compression force caused by swelling after absorbing water.

4. The seedbed of claim 1, wherein ends of said organic fiber bundle are exposed.

5. A method of producing a seedbed with seeds, comprising the steps of:

inserting plant seeds in a cotton-wool-like organic fiber bundle of fiber pieces arranged generally in a single direction, the entire outer surface of said seeds being in contact with said fiber bundle;

compressing said cotton-wool-like fiber bundle containing said seeds in a direction vertical to a direction of the fiber;

rolling water-soluble paper in a way that a cylindrical outer surface of the cotton-wool-like organic fiber bundle is covered by said water-soluble paper;

and fixing both longitudinal ends of a water-soluble paper roll formed by said rolling step with a fixing agent applied at said ends.

6. The method according to claim 4, further comprising the step of:

inserting a water-soluble fertilizer effective in encouraging the inserted plant seeds into the organic fiber bundle.

7. A method of packing a seedbed with seeds, comprising the step of:

packing a predetermined number of seedbeds with seeds in a package having a length of approximately 100 mm, said seedbeds being provided with the seed, compressed, and having a length and diameter of a cotton-wool-like fiber bundle rolled by water-soluble paper wherein the entire outer surface of said seeds contact said fiber bundle.

8. A seedbed with seeds comprising:

an organic fiber bundle in the form of a cylinder of a predetermined length with longitudinal ends;

plant seeds embedded in said fiber bundle so that an outer surface of said plant seeds is entirely covered by said fiber bundle;

a water-soluble paper covering an exterior surface of said organic fiber bundle, said water-soluble paper being designed and adapted to contain said organic fiber bundle when dry.

9. The seedbed of claim 8, wherein said organic fiber bundle further comprises twisted, wavy fibers generally aligned along the length of said organic fiber bundle.

10. The seedbed of claim 9, wherein said water-soluble paper compresses said organic fiber bundle.

11. The seedbed of claim 10, wherein ends of said water soluble paper are fixed with a fixing agent.

12. The seedbed of claim 11, wherein said fixing agent is a starch paste.

13. The seedbed of claim 12, wherein said predetermined length is a length of a cigarette.

14. The seedbed of claim 12, wherein said predetermined length is one meter.

15. The seedbed of claim 8, wherein said water soluble paper is adapted to enter a pulp state and decompose as organic matter when completely solved.

16. The seedbed of claim 8, wherein ends of said organic fiber bundle are exposed.

17. The seedbed of claim 8, further comprising water-soluble grains of fertilizers effective for growing said plant seeds, said fertilizer grains being arranged in line along the length of said organic fiber bundle.

18. The seedbed of claim 8, wherein upon extended exposure to moisture when directly buried in soil said water-soluble paper cover is adapted to be solved and to release said organic fiber bundle under expansive force of said organic fiber bundle.

* * * * *